United States Patent [19]

Bowles et al.

[11] Patent Number: 4,652,269

[45] Date of Patent: Mar. 24, 1987

[54] PROCESS FOR THE CONTINUOUS TRICHROMATIC DYEING OF SYNTHETIC POLYAMIDE MATERIALS: INCLUDING A BLUE ANTHRAQUINONE REACTIVE DYE

[75] Inventors: James B. Bowles, Greensboro; Marshall White, Jr., High Point, both of N.C.; Alois Püntener, Rheinfelden, Switzerland; Jean-Marie Adam, Rosenau, France; Peter Loew, Muenchenstein, Switzerland

[73] Assignee: Ciba-Geigy Corporation, Ardsley, N.Y.

[21] Appl. No.: 857,681

[22] Filed: Apr. 30, 1986

Related U.S. Application Data

[63] Continuation-in-part of Ser. No. 669,549, Nov. 8, 1984, abandoned.

[51] Int. Cl.$^4$ .................. C09B 49/00; C09B 62/00
[52] U.S. Cl. .......................................... 8/641; 8/543; 8/549; 8/643; 8/681; 8/682; 8/683; 8/684; 8/690; 8/924
[58] Field of Search ................... 8/641, 643, 543, 549

[56] References Cited

U.S. PATENT DOCUMENTS 3,538,128  11/1970  Schwander et al. .............. 8/543
3,862,192   1/1975  Schwander et al. .............. 8/543
4,340,387   7/1982  Evans et al. ..................... 8/580
4,349,349   9/1982  Nakatsuka et al. ............... 8/527
4,402,704   9/1983  Raisin et al. ..................... 8/641
4,445,905   5/1984  Schaetzer et al. ................ 8/641
4,514,187   4/1985  Schutz et al. .................... 8/531

FOREIGN PATENT DOCUMENTS 127579   12/1984  European Pat. Off. .
3142852   5/1983  Fed. Rep. of Germany .
903590    8/1962  United Kingdom .
1406665   9/1975  United Kingdom .

OTHER PUBLICATIONS

The Chemistry of Synthetic Dyes, vol. VII, K. Venkataraman, National Chemical Laboratory, Poona, India, pp. 92-95, (1974).
The Theory of Coloration of Textiles, C. L. Bird, pp. 150 & 151, (1975).

Primary Examiner—A. Lionel Clingman
Attorney, Agent, or Firm—Edward McC. Roberts; Kevin T. Mansfield

[57] ABSTRACT

Process for the continuous trichromatic dyeing of synthetic polyamide materials which comprises using at least one blue-dyeing fibre-reactive sulfo-containing anthraquinone dye together with at least one red-dyeing sulfo-containing azo dye and at least one yellow- or orange-dyeing sulfo-containing azo dye.

The process according to the invention is suitable for the continuous dyeing of synthetic polyamide materials from aqueous liquors, producing level dyeings having good fastness properties, in particular good ozone fastness.

13 Claims, No Drawings

PROCESS FOR THE CONTINUOUS TRICHROMATIC DYEING OF SYNTHETIC POLYAMIDE MATERIALS: INCLUDING A BLUE ANTHRAQUINONE REACTIVE DYE

CROSS-REFERENCE

This is a continuation-in-part of application Ser. No. 669,549 filed Nov. 8, 1984 now abandoned.

The present invention relates to a process for the continuous trichromatic dyeing of synthetic polyamide materials with at least one blue-dyeing fibre-reactive sulfo-containing anthraquinone dye, at least one red-dyeing sulfo-containing azo dye and at least one yellow- or orange-dyeing sulfo-containing azo dye.

It is repeatedly found that trichromatic dyeings on synthetic polyamide materials do not meet present-day demands on the ozone fastness of dyeings.

It is the object of the present invention to provide a process for dyeing synthetic polyamide materials with dyes which are suitable for trichromatic combinations which produces dyeings of very good ozone fastness.

This object is achieved according to the invention with the process described hereinafter. The dyeings produced thereby meet the stated demands on ozone fastness.

The present invention accordingly provides a process for the continuous trichromatic dyeings of synthetic polyamide materials which comprises using at least one blue-dyeing fibre-reactive sulfo-containing anthraquinone dye together with at least one red-dyeing sulfo-containing azo dye and at least one yellow- or orange-dyeing sulfo-containing azo dye.

Trichromatic dyeing is to be understood as meaning the additive colour mixture of suitably chosen yellow- or orange-, red and blue-dyeing dyes with which every desired shade of the visible colour spectrum can be matched by a suitable choice of the mixing ratios of the dyes.

The process according to the invention produces dyeings of good to very good ozone fastness.

Suitable blue-dyeing fibre-reactive sulfo-containing anthraquinone dyes are for example the anthraquinone dyes given in the Colour Index as reactive blues.

Suitable red-, yellow- and orange-dyeing sulfo-containing azo dyes are for example the azo dyes given in the Colour Index as acid reds, acid yellows and acid oranges respectively.

In a preferred embodiment of the process according to the invention, at least one blue dye of the formula

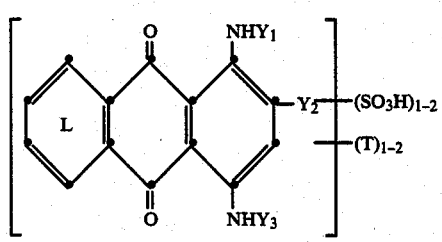

(1)

in which the ring L can be substituted by hydroxyl, halogen or sulfo, $Y_1$ is hydrogen, $C_{1-8}$-alkyl, $C_{5-7}$-cycloalkyl, phenyl or phenyl-$C_{1-8}$-alkyl, $Y_2$ is hydrogen or halogen, such as chlorine or bromine, or is preferably a sulfo group, $Y_3$ is unsubstituted or $C_{1-4}$-alkyl-, $C_{1-4}$-alkoxy-, phenoxy-, $C_{1-4}$-alkylphenoxy or naphthoxy-substituted phenyl or phenyl-$C_{1-8}$-alkyl, and T is a fibre-reactive radical which is bonded either directly or via a bridge member, is used together with at least one red dye of the formula

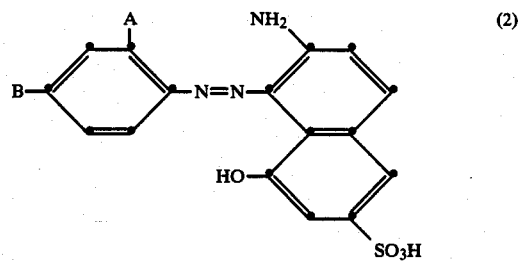

(2)

in which A is hydrogen, substituted or unsubstituted $C_{1-4}$-alkyl,

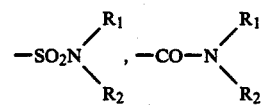

or $-SO_2R_3$, where $R_1$ is $C_{1-4}$-alkyl, $R_2$ is substituted or unsubstituted $C_{5-7}$-cycloalkyl or substituted or unsubstituted phenyl, and $R_3$ is substituted or unsubstituted phenyl or substituted or unsubstituted phenoxy, and B is hydrogen, halogen, $C_{2-4}$-alkanoylamino, $C_{5-8}$-cycloalkoxycarbonylamino, $C_{1-4}$-alkoxycarbonylamino, $C_{1-4}$-alkylsulfonylamino or substituted or unsubstituted phenylsulfonylamino, and with at least one yellow or orange dye of the formulae

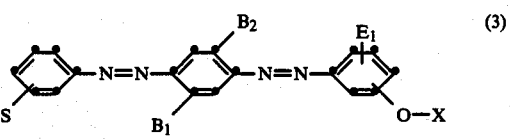

(3)

in which $B_1$, $B_2$ and $E_1$ are each hydrogen, $C_{1-4}$-alkyl or $C_{1-4}$-alkoxy and X is straight-chain or branched $C_{1-4}$-alkyl or straight-chain or branched $C_{2-4}$-hydroxyalkyl, or

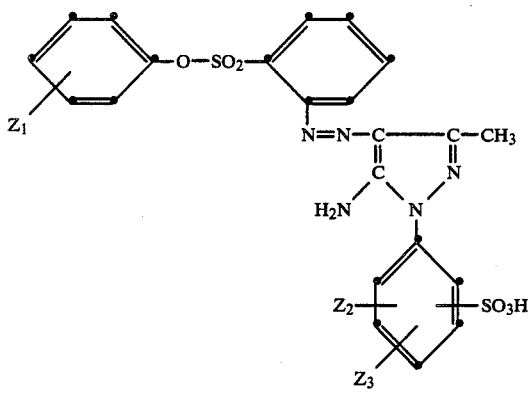

(4)

in which $Z_1$, $Z_2$ and $Z_3$, independently of one another are each hydrogen, halogen, $C_{1-4}$-alkyl or $C_{1-4}$-alkoxy, or mixtures of dyes of the formulae (3) and (4), or a yellow dye of the formula

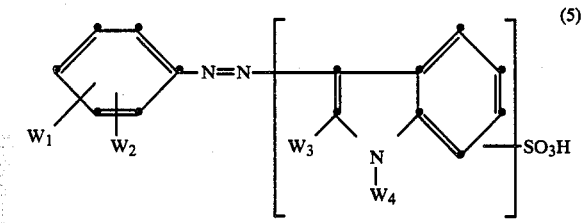

(5)

in which $W_1$ is hydrogen, $C_{1-4}$-alkyl, $C_{1-4}$-alkoxy, halogen, $C_{2-4}$-alkanoylamino or a substituted or unsubstituted arylsulfonyl, aryloxy or arylcarbonyl radical, $W_2$ is hydrogen, halogen, substituted or unsubstituted alkyl, aryloxy or aryloxysulfonyl radical or a radical of the formula

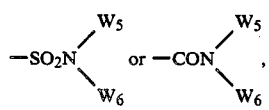

$W_3$ is a substituted or unsubstituted alkyl or aryl radical, $W_4$ is hydrogen or alkyl, and $W_5$ and $W_6$, independently of each other, are each hydrogen or a substituted or unsubstituted alkyl, cycloalkyl or aryl radical.

An alkyl radical $Y_1$ in the formula (1) can be a straight-chain or branched alkyl radical, for example methyl, ethyl, propyl, isopropyl, butyl, sec.-butyl, isobutyl, tert.-butyl, pentyl, hexyl, heptyl or octyl.

A $C_{5-7}$-cycloalkyl radical $Y_1$ in the formula (1) and a $C_{5-7}$-cycloalkyl radical $R_2$ in the formula (2), independently of each other, can be for example an unsubstituted cyclohexyl radical or a cyclohexyl radical which is substituted by alkyl, such as methyl.

A phenyl radical $Y_1$ in the formula (1) can be a phenyl radical which can be substituted by $C_{1-4}$-alkyl, $C_{1-4}$-alkoxy or halogen and be further substituted by a sulfo group and a fibre-reactive radical; the phenyl radical is preferably substituted by a sulfo group and a fibre-reactive radical.

Phenyl-$C_{1-8}$-alkyl radicals $Y_1$ and $Y_3$ in the formula (1), independently of each other, can each be for example a benzyl, phenethyl, phenylbutyl or phenyl-sec.-butyl radical which is preferably substituted by a sulfo group and at least one fibre-reactive radical.

A phenyl radical $Y_3$ in the formula (1) can be a phenyl radical which is substituted by $C_{1-4}$-alkyl, in particular methyl, $C_{1-4}$-alkoxy, in particular methoxy, phenoxy, $C_{1-4}$-alkylphenoxy, for example p-methylphenoxy, or naphthoxy and which is further substituted by a sulfo group and preferably one or two fibre-reactive radicals.

Fibre-reactive radicals T are to be understood as meaning radicals which are capable of reacting with the hydroxyl grops of cellulose, with the amino, carboxyl, hydroxyl and thiol groups of wool and silk, or with the amino and carboxyl groups of synthetic polyamides to form covalent chemical bonds.

Alkyl radicals A, $B_1$, $B_2$, $E_1$, $R_1$, X, $Z_1$, $Z_2$ and $Z_3$ in the formulae (2), (3) and (4), independently of one another, can be straight-chain or branched alkyl radicals, for example methyl, ethyl, propyl, isopropyl, butyl, sec.-butyl, isobutyl or tert.-butyl.

An alkyl radical A can be substituted, for example, by halogen, such as chlorine or bromine or in particular fluorine, but preferably an alkyl raical A is a $C_{1-4}$-perfluoroalkyl radical, in particular a trifluoromethyl radical.

Substituted or unsubstituted phenyl radicals $R_2$ and $R_3$ can each be a phenyl radical which is substituted by $C_{1-4}$-alkyl, $C_{1-4}$-alkoxy or halogen; $R_2$ or $R_3$ is preferably an unsubstituted phenyl radical.

A substituted or unsubstituted phenoxy radical $R_3$ can be a phenoxy radical which is substituted by $C_{1-4}$-alkyl, in particular methyl, $C_{1-4}$-alkoxy or halogen, in particular chlorine; a phenoxy radical $R_3$ is preferably a phenoxy radical which is unsubstituted or substituted by chlorine.

Halogens B, $Z_1$, $Z_2$ and $Z_3$ in the formulae (2) and (4) can each be fluorine or bromine or in particular chlorine.

A $C_{2-4}$-alkanoylamino B in the formula (2) can be for example an acetylamino, propionylamino or butyrylamino radical.

A $C_{5}$-$C_{8}$-cycloalkoxycarbonylamino B can be in particular a cyclohexyloxycarbonylamino radical.

A $C_{1-4}$-alkylsulfonylamino B can be a methylsulfonylamino, ethylsulfonylamino, propylsulfonylamino, isopropylsulfonylamino, butylsulfonylamino, tert.-butylsulfonylamino, isobutylsulfonylamino or sec.-butylsulfonylamino radical.

A phenylsulfonylamino radical can be a phenylsulfonylamino radical which is substituted by $C_{1-4}$-alkyl, $C_{1-4}$-alkoxy or halogen; it preferably is a phenylsulfonylamino radical which is unsubstituted or substituted by methyl.

Alkoxy radicals $B_1$, $B_2$, $E_1$, $Z_1$, $Z_2$ and $Z_3$ in the formulae (3) and (4) can each be for example a methoxy, ethoxy, propoxy, isopropoxy, butoxy, sec.-butoxy, isobutoxy or tert.-butoxy radical.

A hydroxyalkyl radical X in the formula (3) can be a straight-chain or branched hydroxyalkyl radical, for example a β-hydroxyethyl, β-hydroxypropyl, β-hydroxybutyl or α-ethyl-β-hydroxyethyl radical.

A $C_{1-4}$-alkyl $W_1$ is methyl, ethyl, n-propyl, isopropyl, n-butyl, sec.-butyl, isobutyl or tert.-butyl.

A $C_{1-4}$-alkoxy $W_1$ is methoxy, ethoxy, n-propoxy, isopropoxy, n-butoxy, sec.-butoxy, isobutoxy or tert.-butoxy.

A $C_{2-4}$-alkanoylamino $W_1$ is for example acetylamino, propionylamino or butyrylamino.

In a substituted or unsubstituted arylsulfonyl, aryloxy or arylcarbonyl radical $W_1$, aryl is preferably a radical of the benzene or naphthalene series which can be further substituted, for example by $C_{1-4}$-alkyl groups, such as methyl and ethyl, $C_{1-4}$-alkoxy groups, such as methoxy and ethoxy, halogen, such as fluorine, chlorine and bromine, alkanoylamino groups having 1 to 6 carbon atoms, such as acetylamino, and hydroxyl.

Halogens $W_1$ and/or $W_2$ are fluorine, chlorine or bromine.

In a substituted or unsubstituted aryloxy or aryloxysulfonyl radical $W_2$, aryl is a radical of the benzene or naphthalene series which can be further substituted, for example, by $C_{1-4}$-alkyl groups, such as methyl and ethyl, $C_{1-4}$-alkoxy groups, such as methoxy and ethoxy, halogen, such as fluorine, chlorine and bromine, alkanoylamino groups having 1 to 6 carbon atoms, such as acetylamino, and hydroxyl.

Substituted or unsubstituted alkyl radicals $W_2$, $W_3$, $W_5$ and $W_6$, independently of one another, are each preferably a straight-chain or branched $C_{1-12}$-alkyl, in particular $C_{1-4}$-alkyl, radical which can be further substituted, for example by halogen, such as fluorine, chlorine or bromine, hydroxyl, cyano, $C_{1-4}$-alkoxy, such as methoxy or ethoxy, and alkanoyl groups having 1 to 6 carbon atoms, such as the acetyl or propionyl group, and benzoyl group. The alkyl radical $W_3$ can also be substituted by sulfo. Examples of alkyl radicals $W_2$, $W_3$, $W_5$ and $W_6$ are: methyl, ethyl, propyl, isopropyl, butyl, sec.-butyl, tert.-butyl, isobutyl and trifluoromethyl.

Substituted or unsubstituted aryl radicals $W_3$, $W_5$ and $W_6$, independently of one another, are preferably members of the benzene or naphthalene series and can be further substituted, for example by $C_{1-4}$-alkyl groups, such as methyl, $C_{1-4}$-alkoxy groups, such as methoxy and ethoxy, halogen, such as fluorine, chlorine or bromine, trifluoromethyl, alkanoylamino groups having 1 to 6 carbon atoms, such as acetylamino, hydroxyl and carboxyl. The aryl radical $W_3$ can also be substituted by sulfo. In particular aryl radicals $W_3$, $W_5$ and $W_6$ are each a phenyl radical which can be substituted by methyl, trifluoromethyl and chlorine.

An alkyl radical $W_4$ is preferably a straight-chain or branched $C_{1-12}$-alkyl and in particular a $C_{1-8}$-alkyl radical. Examples are: methyl, ethyl, propyl, isopropyl, butyl, sec.-butyl, tert.-butyl, isobutyl, pent-1-yl, pent-3-yl, hept-1-yl, hept-3-yl and oct-1-yl.

Substituted or unsubstituted cycloalkyl radicals $W_5$ and $W_6$, independently of each other, are preferably cycloalkyl groups having 5- to 7-membered rings, which can be further substituted, for example by $C_{1-4}$-alkyl, such as methyl. In particular the cyclohexyl group comes into consideration.

T in the formula (1) is preferably a fibre-reactive radical of the aliphatic, aromatic or heterocyclic series which is bonded to the radical $Y_1$ and/or $Y_3$ either directly or via a bridge member.

T is preferably bonded to the radical $Y_1$ and/or $Y_3$ either directly or via an amino group which can be monoalkylated, for example via —NH—, —N(CH$_3$)—, —N(C$_2$H$_5$)— or —N(C$_3$H$_7$)—, or via a bridge member containing an amino group.

A fibre-reactive radical T in the formula (1) can be for example one of the following aliphatic or aromatic radicals:

vinylsulfonyl, β-chloroethylsulfonyl, β-sulfatoethylsulfonyl, β-acetoxy-ethylsulfonyl, phosphonooxyethylsulfonyl, β-thiosulfatoethylsulfonyl, N-methyl-N-(β-sulfatoethylsulfonyl)-amino, acryloyl, monochloroacryloyl, dichloroacryloyl or trichloroacryloyl such as —CO—CCl=CH$_2$, —CO—CH=CH—Cl, —CO—CCl=CH—CH$_3$; monobromoacryloyl, dibromoacryloyl or tribromoacryloyl such as —CO—CBr=CH$_2$, —CO—CH=CH—Br, —CO—CBr=CH—CH$_3$; and also —CO—CCl=CH—COOH, —CO—CH=CCl—COOH, —CO—CBr=CH—COOH, —CO—CH=CBr—COOH; —CO—CCl=CCl—COOH, —CO—CBr=CBr—COOH; precursors of the acryloyl radical and of the derivatives of the acryloyl radical, such as β-chloropropionyl, β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl; and also 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)-acryloyl, α- or β-alkylsulfonylacryloyl or arylsulfonylacryloyl groups such as α- or β-methylsulfonylacryloyl, propiolyl, chloroacetyl, bromoacetyl, 4-(β-chloroethylsulfonyl)-butyryl, 4-vinylsulfonyl-butyryl, 5-(β-chloroethylsulfonyl)-valeryl, 5-vinylsulfonyl-valeryl, 6-(β-chloroethylsulfonyl)-caproyl, 6-vinylsulfonyl-caproyl; and also 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl.

The fibre-reactive radical T can also be a member of the heterocyclic series, for example a 2,4-dichlorotriazin-6-yl or monohalogenopyrimidinyl, dihalogenopyrimidinyl or trihalogenopyrimidinyl radical, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-monochloromethyl- or -5-dichloromethyl- or -5-trichloromethyl- or -5-methylsulfonyl-pyrimidin-6-yl, 2,5-dichloro-4-methylsulfonyl-pyrimidin-6-yl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5- bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-bis-methylsulfonylpyrimidin-4-yl, 2,5-bis-methylsulfonyl-5-chloropyrimidin-4-yl, 2-methylsulfonyl-pyrimidin-4-yl, 2-phenylsulfonyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methylsulfonyl-5-chloro-6-ethyl-pyrimidin-4-yl, 2-methylsulfonyl-5-chloro-methyl-pyrimidin-4-yl, 2-methylsulfonyl-5-nitro-6-methyl-pyrimidin-4-yl, 2,5,6-tris-methylsulfonyl-pyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloro-pyrimidin-4-yl, 2,6-bis-methylsulfonyl-5-chloropyrimidin-4-yl, 2-methylsulfonyl-6-carboxy-pyrimidin-4-yl, 2-methylsulfonyl-5-sulfo-pyrimidin-4-yl, 2-methylsulfonyl-6-carbomethoxypyrimidin-4-yl, 2-methylsulfonyl-5-carboxy-pyrimidin-4-yl, 2-methylsulfonyl-5-cyano-6-methoxy-pyrimidin-4-yl, 2-methylsulfonyl-5-chloro-pyrimidin-4-yl, 2-sulfoethylsulfonyl-6-methyl-pyrimidin-4-yl, 2-methylsulfonyl-5-bromopyrimidin-4-yl, 2-phenylsulfonyl-5-chloro-pyrimidin-4-yl, 2-carboxymethylsulfonyl-5-chloro-6-methyl-pyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2,4-dichloro-6-methylpyrimidine-5-carbonyl or -5-sulfonyl, 2-methylsulfonyl-6-chloropyrimidin-4-yl and -5-carbonyl, 2,6-bis-(methylsulfonyl)-pyrimidine-4- or -5-carbonyl, 2-ethylsulfonyl-6-chloropyrimidine-5-carbonyl, 2,4-bis-(methylsulfonyl)-pyrimidine-5-sulfonyl, 2-methyl-sulfonyl-4-chloro-6-methyl-pyrimidine-5-sulfonyl or -5-carbonyl; 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or 6-sulfonyl, 1,4-dichlorophthalazine-6-sulfonyl or -6-carbonyl, 2,4-dichloroquinazoline-7- or -6-sulfonyl or -carbonyl, 2,4,6-trichloroquinazoline-7- or -8-sulfonyl, 2- or 3- or 4-(4',5'-dichloropyridaz-6'-on-1'-yl)-phenylsulfonyl or -carbonyl,β-(4',5'-dichloropyridazin-6'-on-1'-yl)-pro-pionyl, 3,6-dichloro-pyridazin-4-carbonyl or -4-sulfonyl, 2-chlorobenzothiazole-5- or -6-carbonyl or -5- or -6-sulfonyl, 2-arylsulfonylbenzothiazole- or 2-alkylsulfonylbenzothiazole-5- or -6-carbonyl or -5- or -6-sulfonyl, such as 2-methylsulfonylbenzothiazole- or 2-ethylsulfonylbenzothiazole-5- or -6-sulfonyl- or -carbonyl, 2-phenylsulfonylbenzothiazole-5- or -6-sulfonyl or -carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl; ammonium-containing triazine rings, such as 2-trimethylammonium-4-phenylamino- or -4-(o-, m- or p-sulfophenyl)-amino-triazin-6-yl, 2-(1,1-dimethylhydrazinium)-4-phenylamino- or -4-(o-, m- or p-sulfophenyl)-aminotriazin-6-yl, 2-(2-isopropylidene-1,1-dimethyl)-hydrazinium-4-phenylamino- or -4-(o-, m- or p-sulfophenyl)-aminotriazin-6-yl, 2-N-aminopyrrolidinium- or 2-N-aminopiperidinium-4-phenylamino- or -4-(o-, m- or p-sulfophenyl)-aminotriazin-6-yl, and also 4-phenylamino- or 4-(sulfophenylamino)-triazin-6-yl radicals which, in the 2-position, contain 1,4-bis-azabicyclo[2.2.2.]octane or 1,2-bis-azabicyclo[0.3.3.]-octane via a quaternary nitrogen bond, 2-pyridinium-4-phenylamino- or -4-(o-, m- or p-sulfophenyl)-aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or ethoxy, or aryloxy, such as phenoxy, or sulfophenoxy groups.

An interesting fibre-reactive radical can also be a chloro- or fluoro-1,3,5-triazine radical of the formula

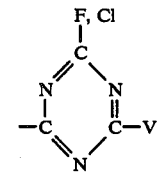

where the substituent V on the triazine ring can be in particular:

halogen, for example chlorine or fluorine, C$_{1-8}$-alkoxy, for example methoxy, cyclohexyloxy, phenoxy, C$_{1-6}$-alkylmercapto, such as methylmercapto, phenylmercapto, —NH$_2$, alkylamino, N,N-dialkylamino, cycloalkylamino, N,N-dicycloalkylamino, aralkylamino, arylamino, mixed-substituted amino groups, such as N-alkyl-N-cyclohexylamino and N-alkyl-N-arylamino groups, and also amino groups such contain heterocyclic radicals which can have further fused-on carbocyclic rings, and amino groups in which the amino nitrogen atom is a member of an N-heterocyclic ring which can contain further hetero atoms, as well as hydrazino and semicarbazido. The abovementioned alkyl radicals can be straight-chain or branched and of low molecular weight or higher molecular weight and are preferably alkyl radicals having 1 to 6 carbon atoms; cycloalkyl, aralkyl and aryl radicals can be in particular cyclohexyl, benzyl, phenethyl, phenyl and naphthyl radicals; heterocyclic radicals can be in particular furan, thiophene, pyrazole, pyridine, pyrimidine, quinoline, benzimidazole, benzothiazole and benzoxazole radicals; and amino groups in which the amino nitrogen atom is a member of an N-heterocyclic ring are preferably radicals of six-membered N-heterocyclic compounds which can contain nitrogen, oxygen or sulfur as further hetero atoms. The abovementioned alkyl, cycloalkyl, aralkyl and aryl radicals, the heterocyclic radicals and the N-heterocyclic rings can be further substituted, for example by: halogen, such as fluorine, chlorine or bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of such amino groups are: —$NH_2$, methylamino, ethylamino, propylamino, isopropylamino, butylamino, hexylamino, β-methoxyethylamino, γ-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloranilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-yl-amino, 1,5-disulfonaphth-2-yl-amino, 6-sulfonaphth-2-yl-amino, morpholino, piperidino, piperazino, hydrazino and semicarbazido.

In particularly preferred embodiments of the process according to the invention, (a) a blue dye of the formula

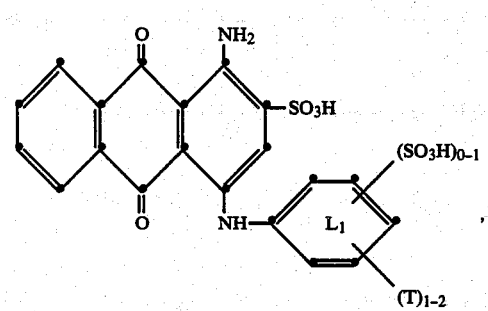

in which T is as defined under the formula (1) and the phenyl ring $L_1$ can be monosubstituted, disubstituted, trisubstituted or tetrasubstituted by $C_{1-4}$-alkyl, $C_{1-4}$-alkoxy or phenoxy, or a blue dye of the formula

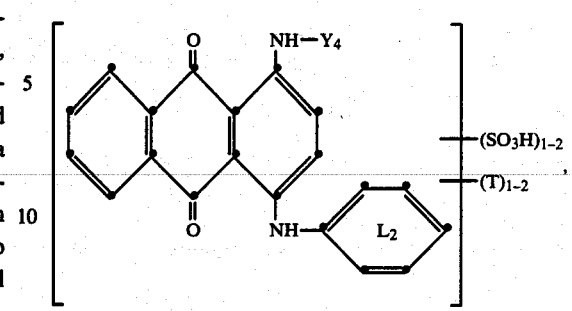

in which $Y_4$ is a $C_{1-6}$-alkyl or $C_{5-7}$-cycloalkyl radical, T is as defined in the formula (1) and the phenyl ring $L_2$ can be monosubstituted, disubstituted or trisubstituted by $C_{1-4}$-alkyl, $C_{1-4}$-alkoxy, phenoxy or $C_{1-4}$-alkylphenoxy, or a blue dye of the formula

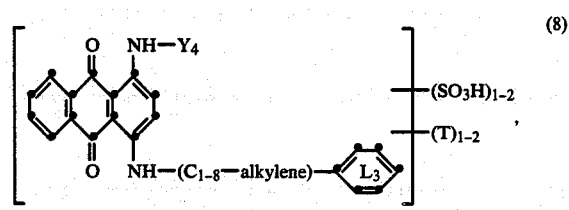

in which $Y_4$ is as defined under the formula (7), T is as defined in the formula (1) and the phenyl ring $L_3$ can be monosubstituted or disubstituted by $C_{1-4}$-alkyl or $C_{1-4}$-alkoxy, or a blue dye of the formula

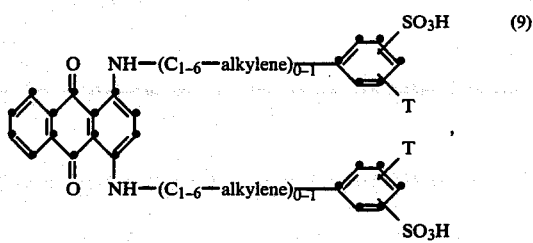

in which T is as defined in the formula (1), is used;

(b) at least one red dye of the formula (2) in which A is hydrogen, methyl, trifluoromethyl,

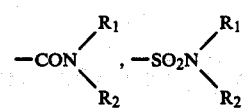

or —$SO_2R_3$
where $R_1$ is methyl or ethyl, $R_2$ is cyclohexyl or phenyl, and $R_3$ is phenyl, methylphenyl, phenoxy or chlorophenoxy, and B is hydrogen, chlorine, acetylamino, propionylamino, cyclohexyloxycarbonylamino, phenylsulfonylamino or methylphenylsulfonylamino, A and B not both being hydrogen at the same time, is used; and (c) at least one yellow or orange dye of the formula

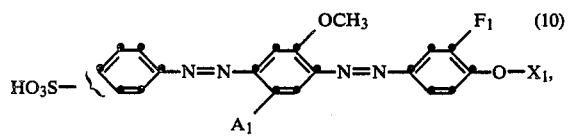

in which $A_1$ is hydrogen or methyl, $F_1$ is hydrogen or methyl and $X_1$ is methyl, ethyl, β-hydroxyethyl, β-hydroxypropyl, β-hydroxybutyl or α-ethyl-β-hydroxyethyl or a mixture of at least one dye of the formula (10) and a yellow dye of the formula

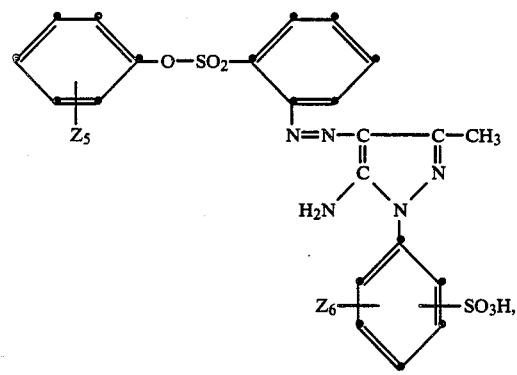

in which $Z_5$ and $Z_6$, independently of each other, are each hydrogen, methyl or chlorine, or a yellow dye of the formula

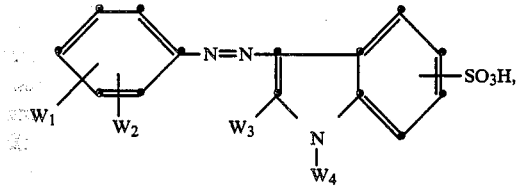

in which $W_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $W_2$ is hydrogen, chlorine, methyl, trifluoromethyl, o-methylphenoxy, o-chlorophenoxy, o-chlorophenoxysulfonyl, —SO$_2$NH$_2$, N-C$_{1-2}$-alkylaminosulfonyl, N,N-dimethylaminosulfonyl, N-methyl-N-β-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —CONH$_2$ or —CON(CH$_3$)$_2$, $W_3$ is methyl or phenyl and $W_4$ is hydrogen, methyl, ethyl or octyl, is used.

In particularly interesting embodiments of the process according to the invention (d) a dye of the formula (6) or (7) is used:

(e) use is made of anthraquinone dyes of the formulae (6) to (9), in particular of the formulae (6) or (7) in which T is a fibre-reactive radical of the aliphatic, aromatic or heterocyclic series which can be bonded via a bridge member of the formula

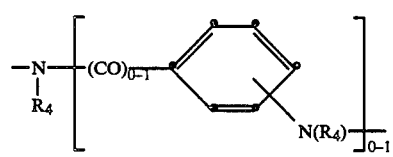

or via

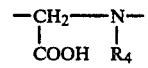

or —CH$_2$—N(R$_4$), and R$_4$ is hydrogen or C$_{1-4}$-alkyl;

(f) use is made of anthraquinone dyes of the formulae (6) to (9) in which T is a chloroacetyl, bromoacetyl, acryloyl, α,β-dichloropropionyl, α,β-dibromopropionyl, α-bromoacryloyl or α-chloroacryloyl radical which is bonded via —NH,

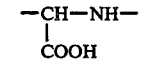

or —CH$_2$—NH— or is a radical of the formulae

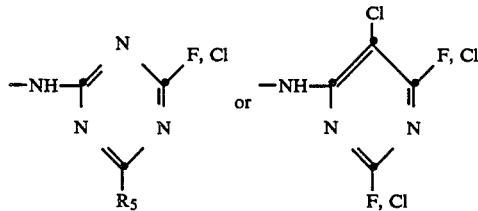

in which $R_5$ is C$_{1-6}$-alkoxy, C$_{1-6}$-alkylmercapto or a radical of the formula $$-N\diagdown_{R_7}^{R_6}$$

where $R_6$ and $R_7$, independently of each other, are each hydrogen, C$_{1-6}$-alkyl or substituted or unsubstituted phenyl or naphthyl, or is a vinylsulfonyl, β-sulfatoethylsulfonyl, β-acetoxyethylsulfonyl, β-chloroethylsulfonyl or β-(β'-sulfatoethylsulfonyl)-propionylaminomethyl radical;

(g) use is made of preferably a blue anthraquinone dye of the formula

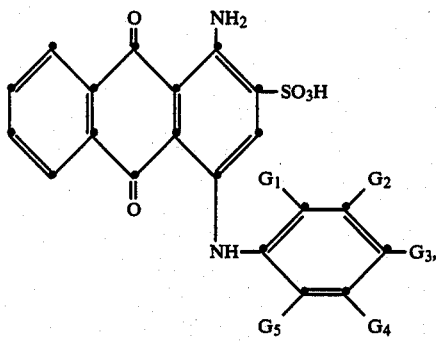

(13)

in which $G_1$, $G_3$ and $G_5$ are each methyl, $G_4$ is α-chloroacryloylaminomethyl or α-bromoacryloylaminomethyl, α,β-dibromopropionylaminomethyl, β-(β'-sulfatoethylsulfonyl)-propionylaminomethyl, α,β-dibromopropionylamino

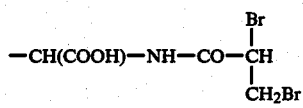

or chloroacetylaminoethyl and $G_2$ is hydrogen, sulfo or chloroacetylaminomethyl or —CH(COOH)—NH—CO—CHBr—CH$_2$Br, or in which $G_1$ is hydrogen or methoxy, $G_2$, $G_3$ and $G_5$ are each hydrogen and $G_4$ is sulfatoethylsulfonyl, chloroacetylamino, α,β-dibromopropionylamino, vinylsulfonyl, 2-methoxy-4-fluoro-s-triazinylamino or 2-ethylamino-4-fluoro-s-triazinylamino, or in which G1, G2, G4 and G5 are each hydrogen and G3 is chloroacetylamino, α,β-dibromopropionylamino, 2,6-difluoro-5-chloropyrimidin-4-yl-amino or 2-chloro-4-amino- or 4-N,N-dimethylamino-s-triazinylamino, or in which $G_1$ is methyl, $G_2$ is β-sulfatoethylsulfonyl and $G_3$, $G_4$ and $G_5$ are each hydrogen, or in which $G_1$ or $G_2$ is sulfo, $G_3$ is α-bromoacryloylamino or N-methyl-N-[3-(β-chloroethylsulfonyl)-benzoyl]-amino and $G_2$ or $G_1$ and $G_4$ and $G_5$ are each hydrogen, or $G_1$, $G_2$ and $G_5$ are each hydrogen, $G_3$ is methyl and $G_4$ is chloroacetylamino, or in which $G_1$ is methyl, $G_2$ is 2,6-difluoro-5-chloropyrimidinylamino, $G_4$ is sulfo and $G_3$ and $G_5$ are each hydrogen; and (h) in particular a dye of the formula (13) in which $G_1$, $G_2$, $G_4$ and $G_5$ are each hydrogen and $G_3$ is chloroacetylamino or α,β-dibromopropionylamino, or in which $G_1$, $G_2$, $G_3$ and $G_5$ are each hydrogen and $G_4$ is vinylsulfonyl, chloroacetylamino, 2-methoxy- or 2-ethylamino-4-fluoro-s-triazinylamino, or in which $G_1$, $G_3$ and $G_5$ are each methyl, $G_2$ is hydrogen and $G_4$ is chloroacetylaminomethyl, α,β-dibromopropionylaminomethyl or —CH(COOH)—NH—CO—CHBr—CH$_2$Br, or in which $G_1$ is methoxy, $G_2$, $G_3$ and $G_5$ are each hydrogen and $G_4$ is β-sulfatoethylsulfonyl, or in which $G_1$, $G_3$ and $G_5$ are each hydrogen and $G_2$ and $G_4$ are each chloroacetylaminomethyl or —CH(COOH)—NH—CO—CHBr—CH$_2$Br, or in which $G_1$, $G_3$ and $G_5$ are each methyl, $G_2$ is α,β-dibromopropionylamino and $G_4$ is sulfo, or in which $G_1$ is sulfo, $G_2$, $G_4$ and $G_5$ are each hydrogen and $G_3$ is α-bromoacryloylamino, or in which $G_1$ is methyl, $G_2$ is 2,6-difluoro-5-chloropyrimidylamino, $G_3$ and $G_5$ are each hydrogen and $G_4$ is sulfo; or (i) use is made of a blue dye of the formula (1) in which $Y_1$ is cyclohexyl, $Y_2$ is hydrogen, $Y_3$ is 4-(4'-methylphenoxy)-phenyl and T is chloroacetylaminomethyl and the dye contains a single sulfo group, or in which $Y_1$ is isopropyl, $Y_2$ is hydrogen and $Y_3$ is a phenyl-sec.-butyl radical which is substituted in the phenyl ring by sulfo and chloroacetylaminomethyl or is a diphenyl ether radical which is substituted in the phenoxy radical by sulfo and acryloylaminomethyl, or in which $Y_1$ and $Y_3$ both denote a phenyl-sec.-butyl radical which is substituted in the phenyl ring by sulfo and chloroacetylamino methyl, and $Y_2$ is hydrogen, or in which $Y_1$ and $Y_3$ both denote a 4-α-bromoacryloylamino-3-sulfophenyl radical and $Y_2$ is hydrogen.

Of the dyes given in (i), preference is given to the dye of the formula (1) in which $Y_1$ is cyclohexyl, $Y_2$ is hydrogen and $Y_3$ is 4-(4'-methylphenoxy)-phenyl, the phenyl ring of the phenoxy group being substituted by sulfo and chloroacetylaminomethyl.

In a particularly important embodiment of the process according to the invention, a blue dye of the formula (13) in which $G_1$, $G_2$, $G_4$ and $G_5$ are each hydrogen and $G_3$ is α,β-dibromopropionylamino, or in which $G_1$, $G_3$, $G_4$ and $G_5$ are each hydrogen and $G_2$ is vinylsulfonyl, chloroacetylamino, 2-methoxy-4-fluoro-s-triazinylamino or 2-ethylamino-4-fluoro-s-triazinylamino, or in which $G_1$ is methyl, $G_2$ is 2,6-difluoro-5-chloropyrimidinylamino, $G_3$ and $G_5$ are each hydrogen and $G_4$ is sulfo, or in which $G_1$ is methoxy, $G_2$, $G_3$ and $G_5$ are each hydrogen and $G_4$ is β-sulfatoethylsulfonyl, or in which $G_1$, $G_3$ and $G_5$ are each methyl, $G_2$ is hydrogen or —CH(COOH)—NH—CO—CHBr—CH$_2$Br and $G_4$ is α,β-dibromopropionylaminomethyl or —CH(COOH)—NH—CO—CHBr—CH$_2$Br, or in which $G_1$, $G_3$ and $G_5$ are each methyl, $G_2$ is α,β-dibromopropionylamino and $G_4$ is sulfo, or in which $G_1$ is sulfo, $G_2$, $G_4$ and $G_5$ are each hydrogen and $G_3$ is α-bromoacryloylamino, is used together with a red dye of the formula (2) and the yellow or orange dyes of the formulae (3) and/or (4) or (5).

In very particularly important embodiments of the process according to the invention, the blue dye of the formula

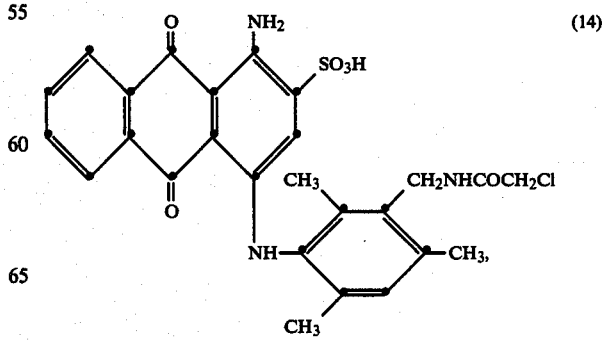

(14)

or the dye of the formula

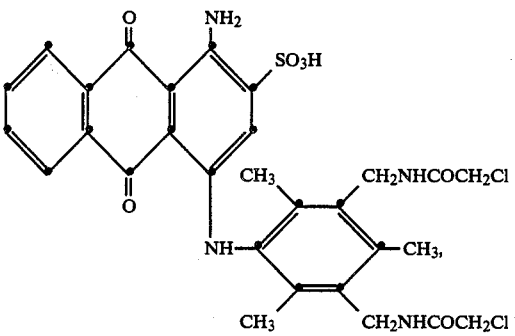

or the dye of the formula

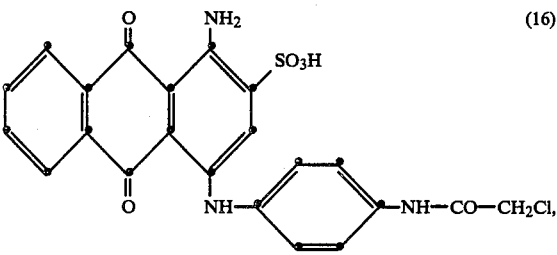

or the dye of the formula

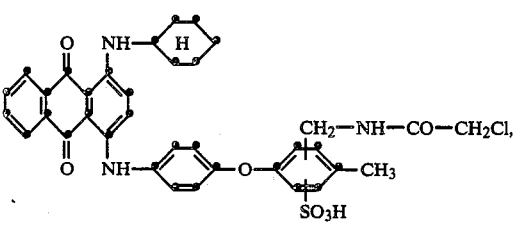

is used.

In the process according to the invention, it is also possible to use mixtures of two or more anthraquinone dyes of the type defined. In particular, use is made of a mixture of two anthraquinone dyes whose individual components each contain one or two fibre-reactive groups and one or two sulfo groups.

Preferably, each individual component of the mixture corresponds to one of the anthraquinone dyes specified above under the formula (1).

It is very particularly preferred to use in the process according to the invention mixtures of anthraquinone dyes of the fomulae (6), (7), (8) or (9), i.e. mixtures in which one component corresponds to a dye of the formula (6), (7), (8) or (9) and the other component corresponds to a dye of the formula (6), (7), (8) or (9). In particular, use is made of a mixture of two anthraquinone dyes in which one component corresponds to a dye of the formula (6) and the other component corresponds to a dye of the formula (6) or (7).

In an important mixture of anthraquinone dyes which can be used in the process according to the invention, one component corresponds to a dye of the formula (14), (15) or a dye of the formula (7) in which $Y_4$ is cyclohexyl, $L_2$ is substituted by p-methylphenoxy and T is chloroacetylaminomethyl, and the dye of the formula (7) contains only one sulfo group, and the other component corresponds to a dye of the formula (13) in which $G_1$, $G_2$, $G_4$ and $G_5$ are each hydrogen and $G_3$ is $\alpha,\beta$-dibromopropionylamino, or in which $G_1$, $G_3$, $G_4$ and $G_5$ are each hydrogen and $G_2$ is vinylsulfonyl, chloroacetylamino, 2-methoxy-4-fluoro-s-triazinylamino or 2-ethylamino-4-fluoro-s-triazinylamino, or in which $G_1$ is methyl, and $G_2$ is 2,6-difluoro-5-chloropyrimidinylamino, $G_3$ and $G_5$ are both hydrogen and $G_4$ is sulfo, or in which $G_1$ is sulfo, $G_2$, $G_4$ and $G_5$ are each hydrogen and $G_3$ is $\alpha$-bromoacryloylamino, or in which $G_1$, $G_3$ and $G_5$ are each methyl, and $G_2$ is $\alpha,\beta$-dibromopropionylaminomethyl, —CH(COOH)—NH—CO—CHBr—CH$_2$Br or $\alpha,\beta$-dibromopropionylamino and $G_4$ is hydrogen, —CH(COOH)—NH—CO—CHBr—CH$_2$Br or sulfo, or in which $G_1$ is methoxy, $G_2$, $G_3$ and $G_5$ are each hydrogen and $G_4$ is $\beta$-sulfatoethylsulfonyl.

In a particularly important mixture of anthraquinone dyes which can be used in the process according to the invention, one component corresponds to the dye of the formula (14) or (15) and the other component corresponds to the dye of the formula (7) in which $Y_4$ is cyclohexyl, $L_2$ is substituted by p-methylphenoxy and T is chloroacetylaminomethyl and the dye of the formula (7) contains only one sulfo group.

In a further particularly important mixture of anthraquinone dyes which can be used in the process according to the invention, one component corresponds to the dye of the formula (14) or (15) and the other component corresponds to the dye of the formula (13) in which $G_1$, $G_2$, $G_4$ and $G_5$ are each hydrogen and $G_3$ is chloroacetylamino.

In a very particularly important mixture of anthraquinone dyes which can be used in the process according to the invention, one component corresponds to the dye of the formula (15) and the other component corresponds to the dye of the formula (17). Preferably the weight ratio of the dyes of the formulae (15) to (17) is 90:10 to 70:30, in particular 80:20.

In general the weight ratio of the anthraquinone dyes in the mixtures used according to the invention can vary within wide limits. A weight ratio of 90:10 to 10:90 and in particular of 70:30 to 30:70, has been found to be advantageous.

The anthraquinone dyes of the formula (1) or the components of the mixtures of the anthraquinone dyes used in the process according to the invention preferably contain only one sulfo group.

In the process according to the invention, the red dye used is preferably (j) a red dye of the formula (2) in which A is hydrogen, N-methyl-N-cyclohexylsulfamoyl, phenylsulfonyl, N-ethyl-N-phenylsulfamoyl, phenoxysulfonyl or trifluoromethyl and B is hydrogen, acetylamino or cyclohexyloxycarbonylamino; and in particular (k) a red dye of the formula (2) in which A is hydrogen and B is acetylamino or cyclohexyloxycarbonylamino or A is trifluoromethyl and B is acetylamino or A is phenylsulfonyl, N-methyl-N- cyclohexylsulfamoyl, N-ethyl-N-phenylsulfamoyl or phenoxysulfonyl and B is hydrogen; and the yellow or orange dye of the formulae (3) to (5) is (I) the yellow dye of the formula

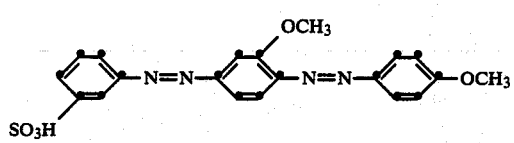 (18)

or the orange dye of the formula

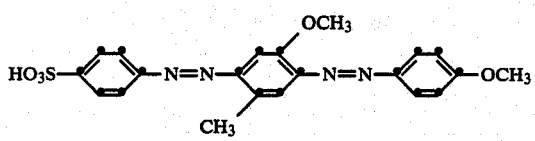 (19)

or a mixture of the yellow dye of the formula (18) with the orange dye of the formula (19), or a mixture of the dyes of the formulae (18) and/or (19) with the dye of the formula

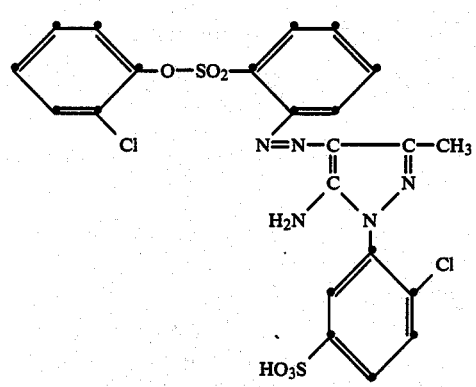 (20)

are used, in weight ratios of the dyes of formulae (18) and (19) of 60:40 to 40:60 and in particular 1:1 and weight ratios of the dyes of the formulae (18) or (19) and (20) of 80:20 to 20:80 and in particular 70:30 and weight ratios of the dyes of the formulae (18), (19) and (20) of 60:20:20, 20:60:20 to 20:20:60 and in particular 1:1:1, or the yellow dye of the formula

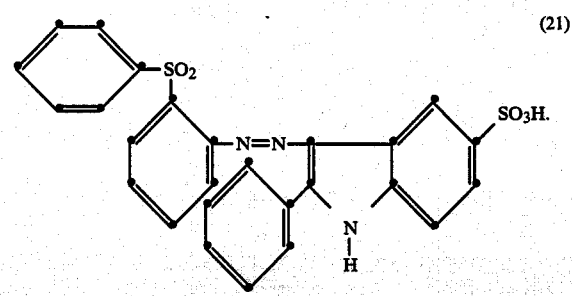 (21)

In a very particularly preferred embodiment of the process according to the invention, a blue dye of the formula (14), (15), (16) or (17) or a mixture of the dyes of the formulae (15) and (17) is used in a weight ratio of in particular 70:30 together with a red dye of the formulae

 (22)

 (23)

or

 (24)

and the yellow dye of the formula (18), (19) or (21) or the mixture of the yellow dyes of the formulae (18) and (20) in a weight ratio of 70:30.

In a very particularly important embodiment of the process according to the invention, a dye of the formula (14) or (15) is used together with a dye of the formula (22) and the dye of the formula (19).

The dyes used for trichromatic dyeing in the process according to the invention are known or can be prepared analogously to a known method. For instance, the dyes of the formula (1) can be prepared as indicated in German Offenlegungsschriften Nos. 2,305,206 and 3,142,852, in Swiss Pat. No. 466,470 and in British Pat. No. 903,590, the dyes of the formula (2) are indicated in German Pat. Nos. 702,932 and 2,063,907 and in German Offenlegungsschrift No. 2,712,170 and the dyes of the formulae (3) and (4) as indicated in German Offenlegungsschrift No. 2,142,412 and German Auslegeschrift No. 1,100,846.

Mixtures of dyes used in the process according to the invention can be prepared by mixing the individual dyes, for example in suitable mills, for example ball and pin mills, and in kneaders or mixers.

Mixtures of dyes can also be prepared by spray-drying the aqueous mixtures of dyes.

The dyes used in the process according to the invention are either in the form of their free sulfonic acid or preferably in the form of its salts.

Examples of suitable salts are the alkali metal, alkaline earth metal and ammonium salts and the salts of organic amines. Examples are the sodium, lithium, potassium and ammonium salts and the salt of triethanolamine.

The dyes used in the process according to the invention generally contain further additives, such as sodium chloride or dextrin.

The novel process for trichromatic dyeing can be applied to the customary continuous dyeing methods. The dyeing liquors, in addition to water and the dyes, can contain further additives, for example wetting agents, antifoams, levelling agents or agents which affect the nature of the textile material, for example softeners, fire retardants or soil-, water- or oil-repellent agents, and water-softening agents and natural or synthetic thickeners, for example alginates or cellulose ethers.

The process according to the invention is particularly suitable for dyeing from short liquors and employed for example in continuous dyeing methods or/and continuous foam-dyeing methods.

The dyes used in the process according to the invention are distinguished in trichromatic dyeing by uniform build-up, good exhaustion properties, good shade consistency even in different concentrations, good fastness properties, in particular very good ozone fastness, and good compatibility.

The process according to the invention is suitable for the continuous dyeing of synthetic polyamide materials, for example nylon or Perlon, in particular nylon 66 and preferably nylon 6 materials.

Said textile material can be dyed at various stages in processing, for example as fibre, yarn, woven fabric or knitted fabric and in particular as carpet.

The particularly noteworthy good ozone fastness of the dyeings obtained with the process according to the invention is determined by American Association of Textile Chemists and Colorists test methods 109-1975 and 129-1975.

The amounts in which the dyes or mixtures are used in the dyebaths can vary within wide limits depending on the desired depth of shade; in general amounts of 0.001 to 6% by weight on weight of fibre have been found to be advantageous.

The liquor ratio can be chosen within a wide range, in particular from 1:1 to 1:5 in the case of continuous dyeing methods.

Dyeing takes place from an aqueous liquor at temperatures between 60° and 98° C. Preferably the dyeing liquor is hot when padded or sprayed on the cloth.

The pH range of the dyeing liquor can vary within the range from 5 to 9. In general, a pH of 6 to 8.5 has been found to be advantageous.

In the following examples, parts are by weight. The temperatures are given in degrees centigrade. Parts by weight relate to parts by volume as the gramme relates to the cubic centimeter.

EXAMPLE 1

An aqueous solution containing per liter 0.65 g of the dye of the formula

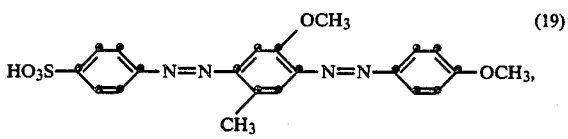

0.29 g of the dye of the formula

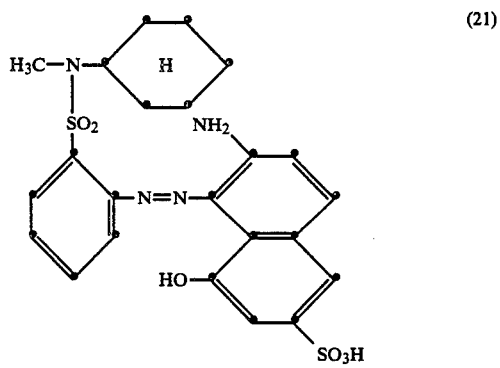

and 0.57 g of the dye of the formula

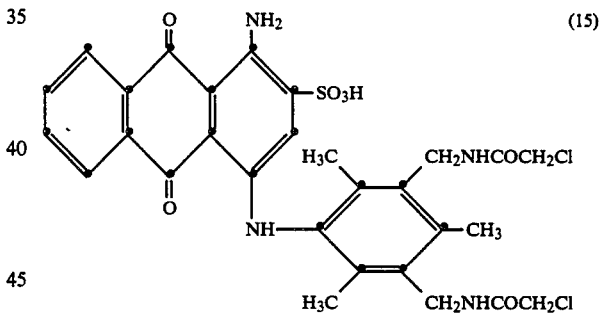

as well as 3 g of an anionic wetting agent is brought to pH 8.2 with $Na_3PO_4$.

300% on weight of fibre of this liquor are applied to a non-prewetted nylon 6 grey state carpet at a liquor temperature of 22° and a carpet speed of 8 meters per minute. The impregnated carpet then passes into a steamer where it is treated with saturated steam at 98° to 100° for four minutes.

The result after a wash in an open-width washer is a carpet in a brown shade which is level in respect of the surface of the carpet and in respect of the individual fibre and has good ozone fastness.

The ozone fastness of the dyeing obtained is tested in accordance with AATCC [American Association of Textile Chemists and Colorists] test method 129-1975, and the colour change is evaluated against the standard grey scale [SNV (Swiss Standards Institute) standard 95805] where 1 is worst and 5 is best.

The dyeing obtained with the above dyes has a fastness level of 4.

The above example is repeated, except that a hot liquor at 90° is used in place of the cold liquor, affording without the use of a steamer or with a residence time in saturated steam at 98° or 100° of one minute a carpet likewise dyed in a level brown of good ozone fastness 4.

EXAMPLE 2

An aqueous solution containing per liter 0.15 g of the dye of the formula

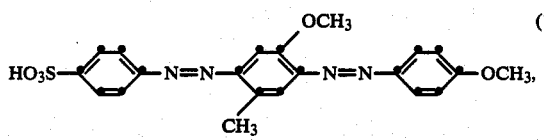
(19)

0.1 g of the dye of the formula

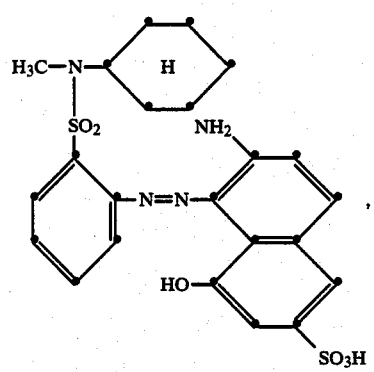
(22)

0.125 g of the dye of the formula

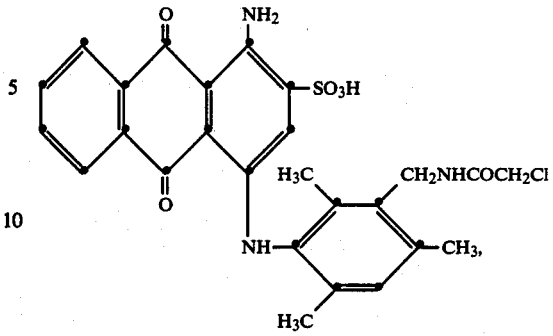
(14)

2.0 g of the ammonium sulfate ester of ethoxylated nonylphenol and 0.5 g of ethoxylated nonylphenol is brought to pH 8.0 with a mixture of Na₂HPO₄ and NaH₂PO₄ and is heated to 96° to 98°. The hot solution is sprayed in a sealed chamber through a number of nozzles under a pressure of 3 atmospheres onto a nylon 66 carpet passing continuously through the chamber. The residence time of the carpet in the chamber is about 5 seconds. The liquor pickup is about 500% on weight of fibre. The result is a nylon 66 carpet dyed a level brown of ozone fastness 3–4, the ozone fastness being assessed as indicated in Example 1.

Example 1 is repeated, except that instead of the combination of dyes of the formulae (19), (22) and (15) which is mentioned in Example 1 the combination of dyes which is indicated in the Table below in Examples 3 to 12 in column II is used in the amounts indicated there, likewise affording carpets which have been dyed a level olive to brown shade and have good ozone fastness, the ozone fastness being assessed as in Example 1 and the fastness level being indicated in column III.

TABLE

| Example | Dyes | Fastness Level |
|---|---|---|
| 3 | 0.84 g/l of the dye of the formula (19)<br><br>1.78 g/l of the dye of the formula (22)<br><br>and<br>0.98 g/l of the dye of the formula | 3–4 |

TABLE-continued

| Example | Dyes | Fastness Level |
|---|---|---|

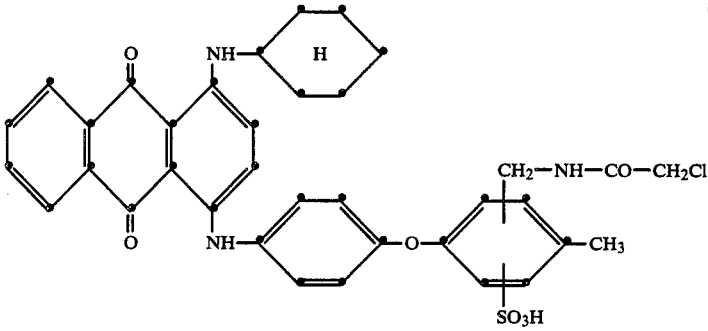  (17)

4   0.92 g/l of the dye of the formula (19)            4
1.67 g/l of the dye of the formula (22) and
0.76 g/l of the dye of the formula

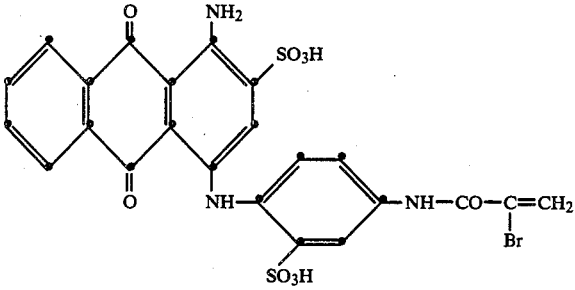  (25)

5   0.90 g/l of the dye of the formula (19),           4
1.30 g/l of the dye of the formula (22) and
1.02 g/l of the dye of the formula

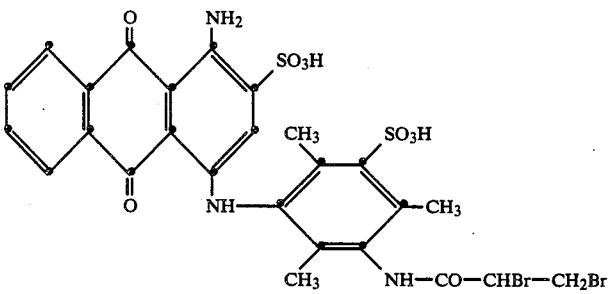  (26)

6   0.92 g/l of the dye of the formula (19),          3–4
1.33 g/l of the dye of the formula (22) and
1.89 g/l of the dye of the formula

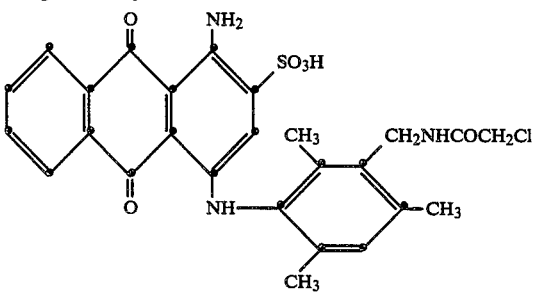  (14)

7   0.86 g/l of the dye of the formula (19),          3–4
1.67 g/l of the dye of the formula (22) and
1.60 g/l of the dye of the formula

| Example | Dyes | Fastness Level |
|---|---|---|
| | 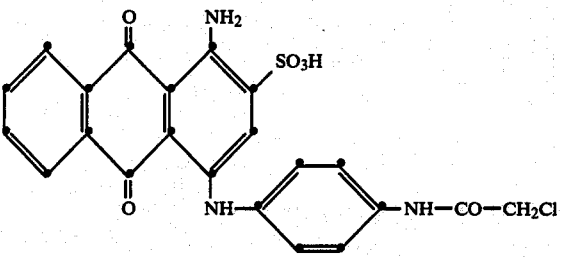 (16) | |
| 8 | 1.18 g/l of the dye of the formula (19), 1.99 g/l of the dye of the formula (22) and 1.14 g/l of the mixture of the dyes of formulae (14) and (17), which contains 80 percent by weight of the dye of the formula (14) and 20 percent by weight of the dye of the formula (17), based on 100% of the mixture. | 4 |
| 9 | 1.97 g/l of the dye of the formula 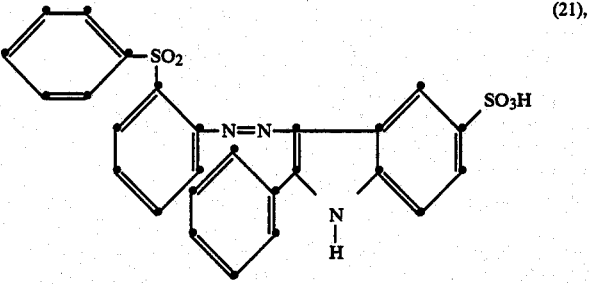 (21), 2.47 g/l of the dye of the formula (22) and 1.08 g/l of the mixture of the dyes of formulae (14) and (17), which contains 80% by weight of the dye of the formula (14) and 20% by weight of the dye of the formula (17), based on 100% of the mixture. | 4 |
| 10 | 1.89 g/l of the dye of the formula 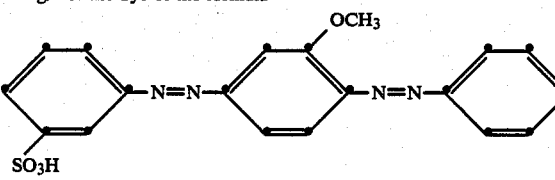 (18), 1.06 g/l of the dye of the formula (23) 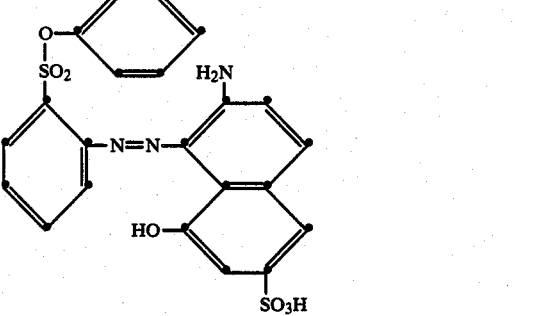 and 1.06 g/l of the dye of formula (14) | 4 |
| 11 | 2.03 g/l of the mixture of the dyes of the formula (18) and | 4 |

TABLE-continued

| Example | Dyes | Fastness Level |
|---|---|---|
| | 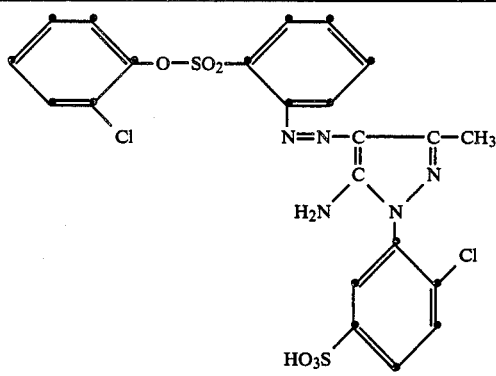 (20), | |
| | where, based on 100% by weight, the mixture contains 70% by weight of the dye of the formula (18) and 30% by weight of the dye of the formula (20), 0.89 g/l of the dye of the formula 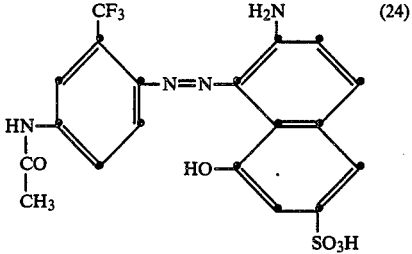 (24) and 1.30 g/l of the mixture of the dyes of the formulae (15) and (17), which contains 80% by weight of the dye of the formula (15) and 20% by weight of the dye of the formula (17), based on 100% of the mixture. | |
| 12 | 1.82 g/l of the dye of the formula (19), 2.32 g/l of the dye of the formula (22) and 1.19 g/l of the dye of the formula 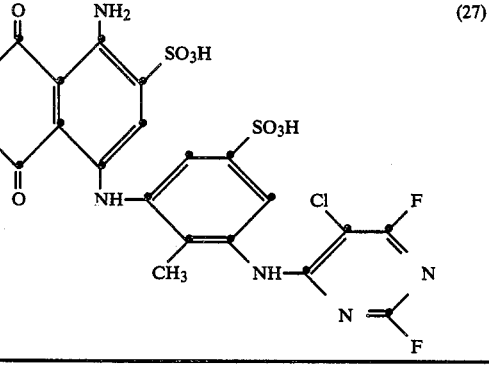 (27) | 4 |

Comparative Example 1

Example 1 is repeated, except that the 0.57 g/l of the dye of the formula (15) is replace by 1.26 g/l of the non fibre-reactive dye of the formula

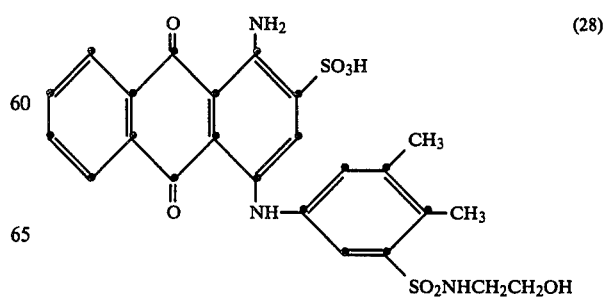 (28)

affording a carpet of brown shade which, according to the test method for ozone fastness [AATCC 129-1975] has a fastness level for the change of shade [SNV standard 95805] of only 2.

Comparative Example 2

Example 1 is repeated, except that the 0.57 g/l of the dye of the formula (15) is replaced by 1.09 g/l of the non fibre-reactive dye of the formula

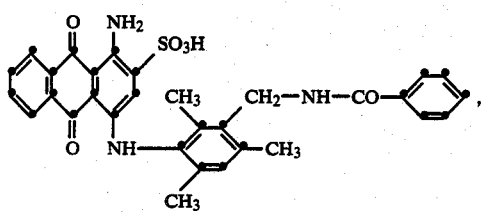
(29)

affording a carpet dyed in a brown shade which, according to the test method indicated in Comparative Example 1, has an ozone fastness level of 2.

What is claimed is:

1. A process for the continuous trichromatic dyeing of synthetic polyamide materials which comprises applying to said materials from a dyeing liquor at least one blue-dyeing dye of the formula

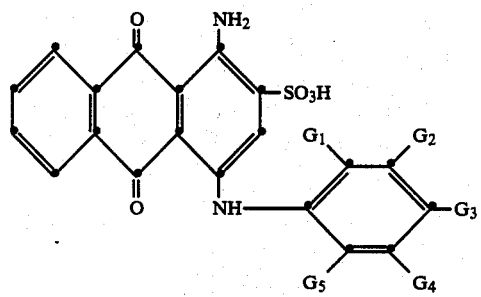
(13)

in which $G_1$, $G_3$ and $G_5$ are each methyl, $G_4$ is α-chloroacryloylaminomethyl or α-bromoacryloylaminomethyl, α,β-dibromopropionylaminomethyl, β-(β'-sulfatoethylsulfonyl)-propionylaminomethyl, α,β-dibromopropionylamino, —CH(COOH)—NH—CO—CHBr—CH₂Br or chloroacetylaminomethyl and $G_2$ is hydrogen, sulfo or chloroacetylaminomethyl or —CH(COOH)—NH—CO—CHBr—CH₂Br, or in which $G_1$ is hydrogen or methoxy, $G_2$, $G_3$ and $G_5$ are each hydrogen and $G_4$ is sulfatoethylsulfonyl, chloroacetylamino, α,β-dibromopropionylamino, vinylsulfonyl, 2-methoxy-4-fluoro-s-triazinylamino or 2-ethylamino-4-fluoro-s-triazinylamino, or in which $G_1$, $G_2$, $G_4$ and $G_5$ are each hydrogen and $G_3$ is chloroacetylamino, α,β-dibromopropionylamino, 2,6-difluoro-5-chloropyrimidin-4-ylamino or 2-chloro-4-amino- or 4-N,N-dimethylamino-s-triazinylamino, or in which $G_1$ is methyl, $G_2$ is β-sulfatoethylsulfonyl and $G_3$, $G_4$ and $G_5$ are each hydrogen, or in which $G_1$ or $G_2$ is sulfo, $G_3$ is α-bromoacryloylamino or N-methyl-N-[3-(β-chloroethylsulfonyl)-benzoyl]-amino and $G_2$ or $G_1$ and $G_4$ and $G_5$ are each hydrogen, or $G_1$, $G_2$ and $G_5$ are each hydrogen, $G_3$ is methyl and $G_4$ is chloroacetylamino, or in which $G_1$ is methyl and $G_2$ is 2,6-dichloro-5-chloropyrimidinylamino, $G_4$ is sulfo and $G_3$ and $G_5$ are each hydrogen, or at least one blue dye of the formula

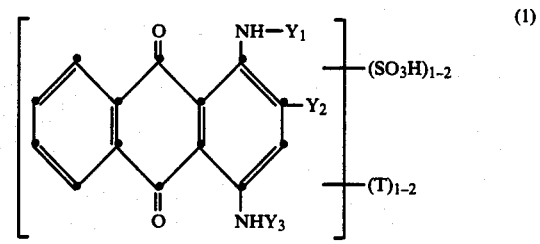
(1)

in which $Y_1$ is cyclohexyl, $Y_2$ is hydrogen, $Y_3$ is 4-(4'-methylphenoxy)-phenyl and T is chloroacetylaminomethyl and the dye contains a single sulfo group, or in which $Y_1$ is isopropyl, $Y_2$ is hydrogen and $Y_3$ is a phenyl-sec.-butyl radical which is substituted in the phenyl ring by sulfo or chloroacetylaminomethyl or is a diphenyl ether radical which is substituted in the phenoxy radical by sulfo and acryloylaminomethyl, or in which $Y_1$ and $Y_3$ both denote a phenyl-sec.-butyl radical which is substituted in the phenyl ring by sulfo and chloroacetylaminomethyl, and $Y_2$ is hydrogen, or in which $Y_1$ and $Y_3$ both denote a 4-α-bromoacryloylamino-3-sulfophenyl radical and $Y_2$ is hydrogen, together with at least one red dye of the formula

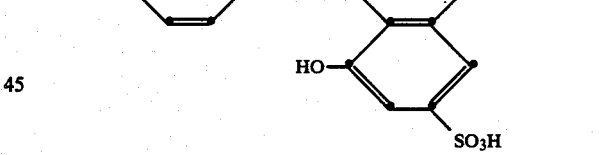
(2)

in which A is hydrogen, substituted or unsubstituted $C_{1-4}$-alkyl,

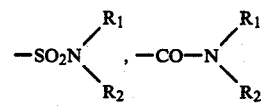

or —SO₂R₃, where $R_1$ is $C_{1-4}$-alkyl, $R_2$ is substituted or unsubstituted $C_{5-7}$-cycloalkyl or substituted or unsubstituted phenyl, and $R_3$ is substituted or unsubstituted phenyl or substituted or unsubstituted phenoxy, and B is hydrogen, halogen, $C_{2-4}$-alkanoylamino, $C_{5-8}$-cycloalkoxycarbonylamino, $C_{1-4}$-alkoxycarbonylamino, $C_{1-4}$-alkylsulfonylamino or substituted or unsubstituted phenylsulfonylamino, and with at least one yellow or orange dye of the formulae

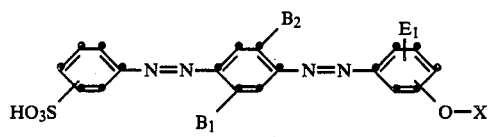

in which $B_1$, $B_2$ and $E_1$ are each hydrogen, $C_{1-4}$-alkyl or $C_{1-4}$-alkoxy and X is straight-chain or branched $C_{1-4}$-alkyl or straight-chain or branched $C_{2-4}$-hydroxyalkyl, or

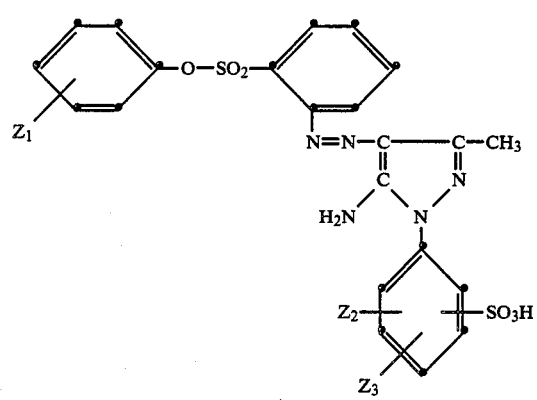

in which $Z_1$, $Z_2$ and $Z_3$, independently of one another are each hydrogen, halogen, $C_{1-4}$-alkyl or $C_{1-4}$-alkoxy, or mixtures of dyes of the formulae (3) and (4), or a yellow dye of the formula

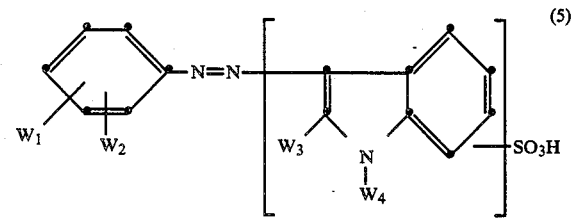

in which $W_1$ is hydrogen, $C_{1-4}$-alkyl, $C_{1-4}$-alkoxy, halogen, $C_{2-4}$-alkanoylamino or a substituted or unsubstituted arylsulfonyl, aryloxy or arylcarbonyl radical, $W_2$ is hydrogen, halogen, a substituted or unsubstituted alkyl, aryloxy or aryloxysulfonyl radical or a radical of the formula

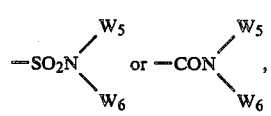

$W_3$ is a substituted or unsubstituted alkyl or aryl radical, $W_4$ is hydrogen or alkyl and $W_5$ and $W_6$, independently of each other, are each hydrogen or a substituted or unsubstituted alkyl, cycloalkyl or aryl radical.

2. A process according to claim 1, wherein the blue dyes of the formulae

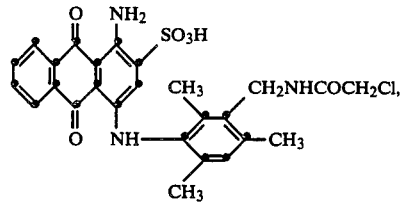

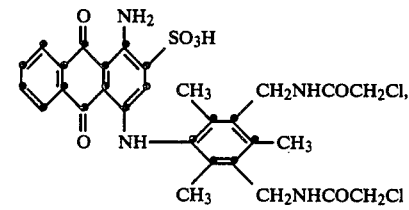

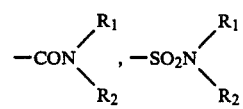

are used.

3. A process according to claim 1, wherein mixtures of two anthraquinone dyes according to the definition given in claim 1 are used.

4. A process according to claim 2, wherein a mixture in which one component conforms to a dye of the formula (13), (14) or (15) and the other component conforms to the dye of the formula (17) is applied.

5. A process according to claim 1, wherein at least one red dye of the formula (2) in which A is hydrogen, methyl, trifluoromethyl, $$-CON\begin{matrix}R_1\\R_2\end{matrix}, \quad -SO_2N\begin{matrix}R_1\\R_2\end{matrix}$$

or $-SO_2R_3$, where $R_1$ is methyl or ethyl, $R_2$ is cyclohexyl or phenyl and $R_3$ is phenyl, methylphenyl, phenoxy or chlorophenoxy, and B is hydrogen, chlorine, acetylamino, propionylamino, cyclohexyloxycarbonylamino, phenylsulfonylamino or methylphenylsulfonylamino, A and B not being hydrogen at the same time is applied.

6. A process according to claim 5, wherein a red dye of the formula (2) in which A is hydrogen, N-methyl-N-cyclohexylsulfamoyl, phenylsulfonyl, N-ethyl-N-phenylsulfamoyl, phenoxysulfonyl or trifluoromethyl and B- is hydrogen, acetylamino or cyclohexyloxycarbonylamino is applied.

7. A process according to claim 6, wherein a red dye of the formula (2) in which A is hydrogen and B is acetylamino or cyclohexyloxycarbonylamino or A is trifluoromethyl and B is acetylamino or A is phenylsulfonyl, N-methyl-N-cyclohexylsulfamoyl, N-ethyl-N-phenylsulfamoyl or phenoxysulfonyl and B is hydrogen is applied.

8. A process according to claim 2 wherein at least one yellow or orange dye of the formula

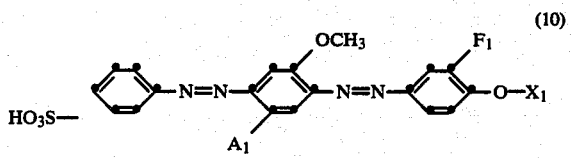

in which $A_1$ is hydrogen or methyl, $F_1$ is hydrogen or methyl and $X_1$ is methyl, ethyl, β-hydroxyethyl, β-hydroxypropyl, β-hydroxybutyl or α-ethyl-β-hydroxyethyl, or a mixture of at least one dye of the formula (10) and a yellow dye of the formula

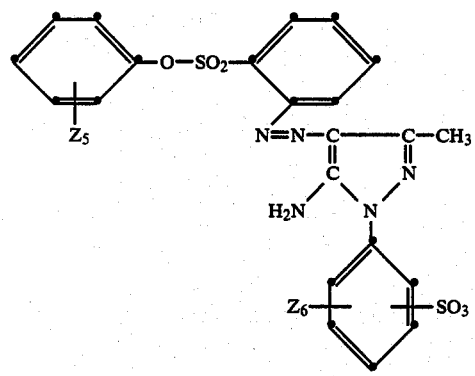

in which $Z_5$ and $Z_6$, independently of each other, are each hydrogen, methyl or chlorine, or a yellow dye of the formula

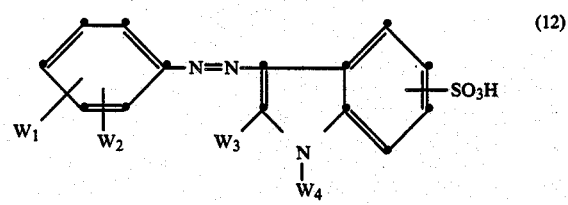

in which $W_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $W_2$ is hydrogen, chlorine, methyl, trifluoromethyl, o-methylphenoxy, o-chlorophenoxy, o-chlorophenoxysulfonyl, —$SO_2NH_2$, N-$C_{1-2}$-alkylaminosulfonyl, N,N-dimethylaminosulfonyl, N-methyl-N-β-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $W_3$ is methyl or phenyl and $W_4$ is hydrogen, methyl, ethyl or octyl is applied.

9. A process according to claim 8, wherein the yellow dye of the formula

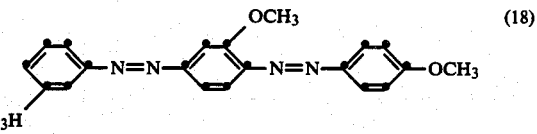

or the orange dye of the formula

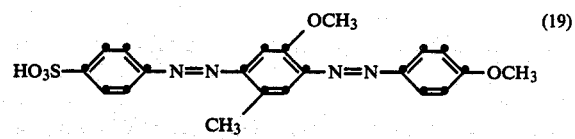

or a mixture of the yellow dye of the formula (18) with the orange dye of the formula (19), or a mixture of the dyes of formulae (18) and/or (19) with the dye of the formula

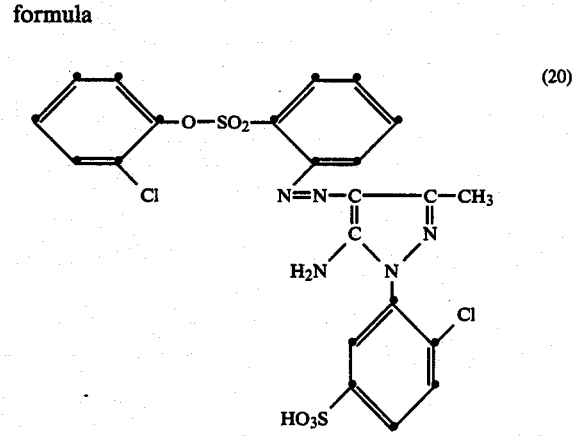

are applied in weight ratios of the dyes of formulae (18) and (19) of 60:40 to 40:60 and in ratios of the dyes of the formulae (18) or (19) and (20) of 80:20 to 20:80 and in particular 70:30, and in weight ratios of the dyes of the formulae (18), (19) and (20) of 60:20:20, 20:60:20 to 20:20:60, or the yellow dye of the formula

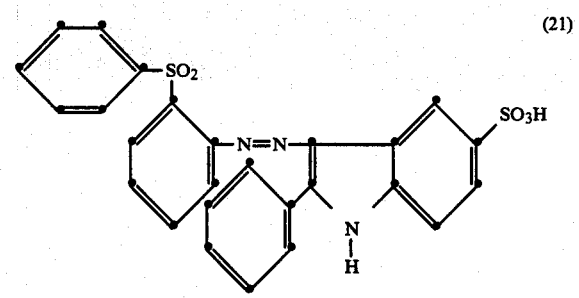

is used.

10. A process according to claim 8, wherein a blue dye of the formula (14), (15), (16) or (17) or a mixture of the dyes of the formulae (15) and (17) is applied in a weight ratio of 70:30 together with a red dye of the formulae (22)

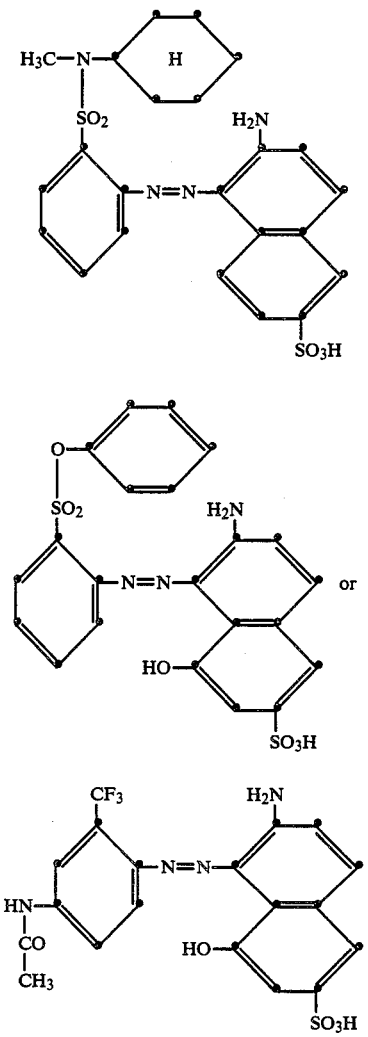

(23)

(24)

and the yellow dye of the formula (18), (19) or (21) or the mixture of the yellow dyes of the formulae (18) and (20) in a weight ratio of 70:30.

11. A process according to claim 10, wherein one of the blue dyes of the formulae (14) or (15) is applied together with the red dye of the formula

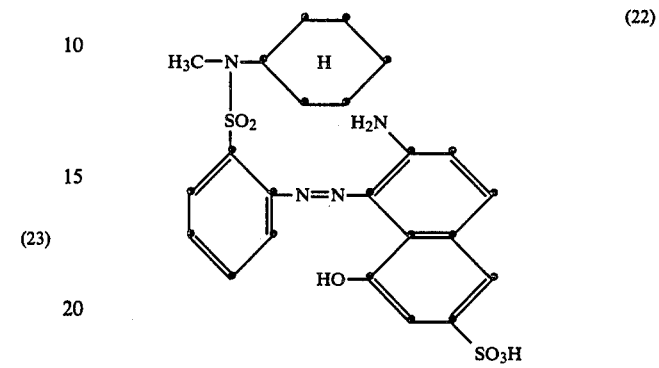 (22)

and the orange dye of the formula

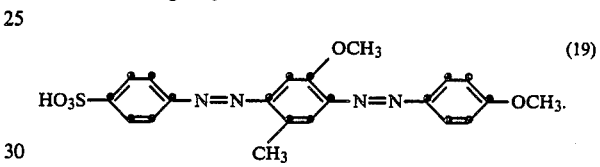 (19)

12. A process for the trichromatic dyeing of materials made of synthetic polyamide which comprises continuously treating said materials with a dyeing liquor which contains a mixture of dyes according to claim 1 and water and can also contain further additives.

13. A process according to claim 9, wherein the dyes of the formulae (18) and (19) are applied in a ratio of 1:1 or the dyes of the formulae (18), (19) and (20) are applied in a ratio of 1:1:1.

* * * * *